April 12, 1938.  F. E. WHITEHEAD ET AL  2,114,243
NUT CRACKING MACHINE
Filed June 25, 1936  2 Sheets-Sheet 1
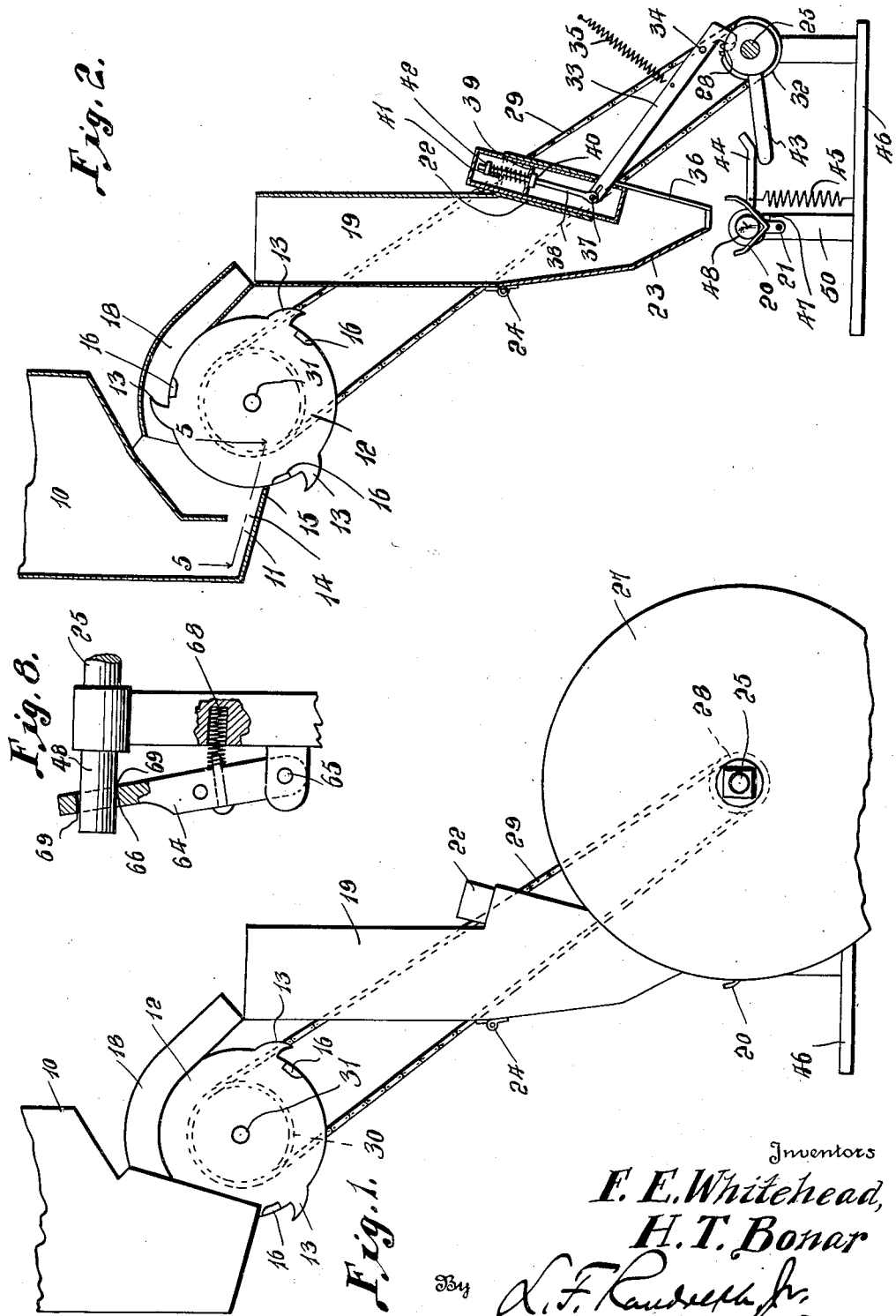
Inventors
F. E. Whitehead,
H. T. Bonar

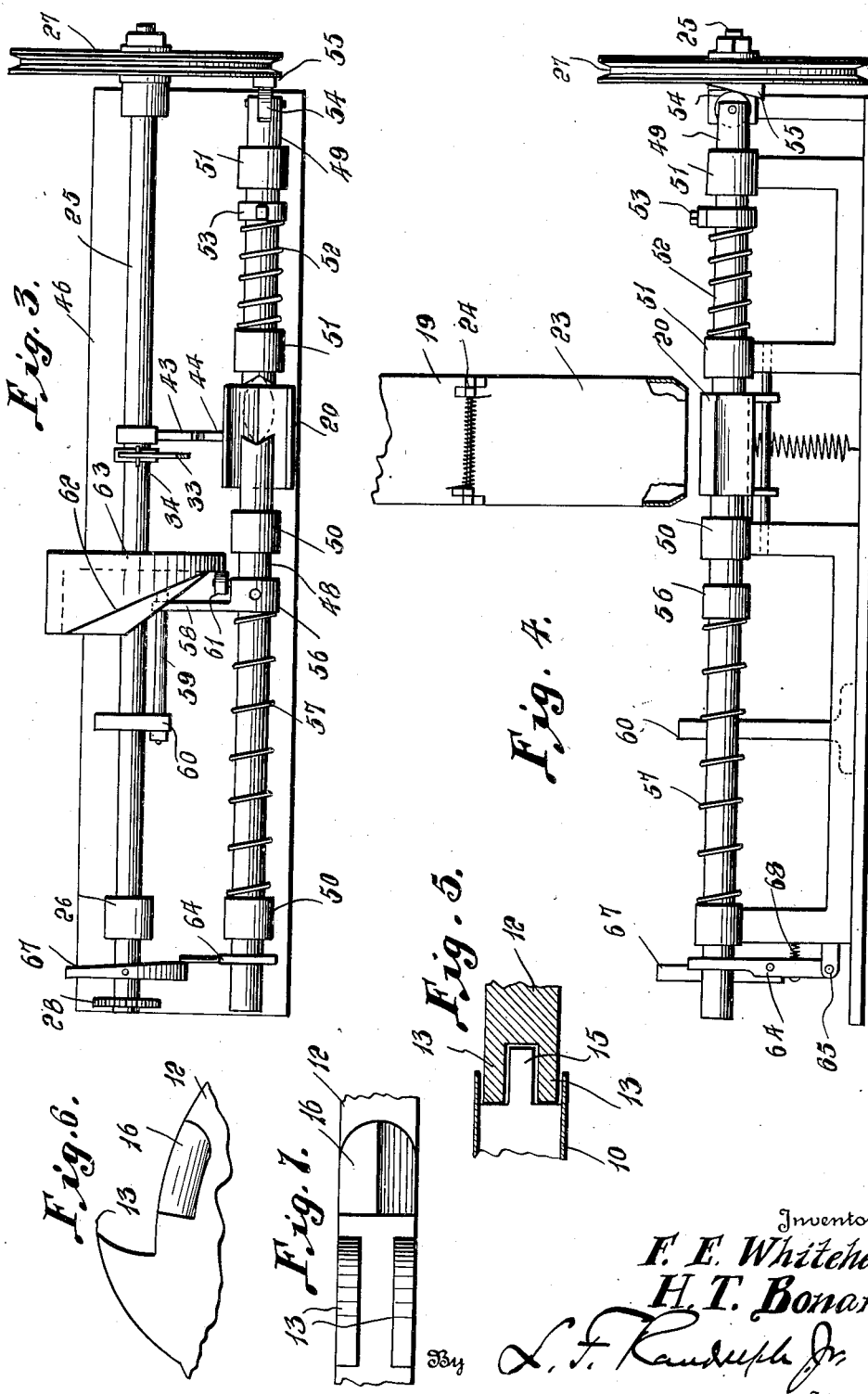

Patented Apr. 12, 1938

2,114,243

UNITED STATES PATENT OFFICE 2,114,243

NUT CRACKING MACHINE

Fred E. Whitehead and Howard T. Bonar,
Stillwater, Okla.

Application June 25, 1936, Serial No. 87,272

2 Claims. (Cl. 146—12)

This invention relates to a nut cracking machine.

It is aimed to provide a novel construction particularly adapted for cracking pecans, although it may obviously be used for the cracking of other nuts.

An important object is to provide a novel means whereby the nuts will be fed at the proper sequence and one at a time to the cracking mechanism; to provide means in the form of relatively movable elements adapted to crack the nuts and to move out of interfering relation with the nut holder or receptacle, so that the latter may be operated to eject the nut; and to provide a novel means whereby the cracking element adapted to remain fixed during the cracking operation, may be more effectively locked than heretofore.

The more specific objects and advantages will become apparent from a consideration of the description following taken in connection with accompanying drawings illustrating an operative embodiment.

In said drawings:

Figure 1 is a view of the machine in end elevation;

Figure 2 is a vertical transverse sectional view through the machine;

Figure 3 is a view of the machine primarily in plane;

Figure 4 is a view of the machine in side elevation;

Figure 5 is a detail section taken on line 5—5 of Figure 2;

Figure 6 is a detail side elevation, fragmentarily, of the supply wheel;

Figure 7 is an upper edge view of the part of Figure 6; and

Figure 8 is an enlarged detail side elevation of the locking mechanism employed with the cracking means.

Referring specifically to the drawings, 10 designates a hopper adapted to contain the pecans or other nuts to be cracked and at the lower end thereof a discharge boot 11 is provided. Coacting with the boot is a hand advancing wheel 12 for the pecans which has any desired number of spaced pairs of nut engaging prongs 13, the boot having an opening 14 whereby the nuts may roll onto the prongs and the boot also having a projection 15 extending between the prongs to better support the nut as it is engaged by the prongs. It will be noted that in advance of each pair of prongs 13, a slight distance from the prongs, the wheel is cut away as at 16, preferably being bevelled downwardly and outwardly from opposite sides so that more than a single nut will not remain in place on each pair of prongs 13 during each rotation of the wheel 12. The prongs deliver and discharge the nuts into a chute 18 communicating with an upstanding feeder 19 having its lower end constricted as best shown in Figure 2, so that the nut will not fall therethrough but will be arrested at such lower end. The nut is adapted to be positively discharged from said end into a holder or receptacle 20 preferably of V-shape as best shown in Figure 2 and pivoted or journaled on a longitudinally extending shaft 21.

Normally raised and slidably disposed within the feeder 19 is a plunger 22 which is adapted to be moved downwardly into engagement with the nut to force the same through the lower end of the feeder, one side wall 23 of the feeder being pivoted as at 24, by means of a spring return hinge, permitting the part 23 to move outwardly automatically to accommodate the escape of the nut.

A power shaft is provided as at 25 mounted in any suitable manner in bearings 26 and it is equipped with a pulley 27 thereon adapted to be driven from any suitable source of power preferably through the medium of a V-belt. On this shaft 25, a sprocket wheel 28 is keyed having a sprocket chain 29 trained thereover which is also trained over a sprocket wheel 30 keyed to a shaft 31, suitably mounted in any desired way, and with which shaft the advancing wheel 12 is rigid.

The plunger 22 is also operable from the shaft 25 as through the medium of a cam 32 whose periphery is followed by a bent end of a lever 33, pivoted at 34 to a suitable support and urged into engagement with the cam by a contractile spring as at 35. Lever 33 passes through a vertically elongated slot 36 in the wall of the feeder 19 and engages by means of a pivot 37 a rod 38 within the plunger. Said rod passes slidably through a spider 39 within the plunger and has an abutment 40 thereon engageable with the spider. A coil spring 41 surrounds the rod 38 and bears against the spider and against an abutment 42 on the rod. By means of the construction, the plunger will automatically adapt itself to different sizes of nuts.

Said shaft 25 has a crank or arm 43 thereon which is engageable with a lug 44 on the holder or receptacle 20, so as to tilt the same to discharge a cracked nut, a contractile coil spring 45 being fastened to the arm 44 and to a supporting base 46.

The spring 45 normally holds the receptacle 20 in engagement with a stop 47.

The cracking mechanism comprises rod-like members 48 and 49, slidably mounted in suitable bearings or brackets 50 and 51, respectively, mounted on the aforesaid base plate 46.

It will be noted from Figure 3 that the cracking member 49 is normally out of the path of movement of the holder or receptacle 20, being urged to that position by an expansive coil spring 52 surrounding the member and abutting one of the bearings 51 and an adjustable collar 53 on the member. The collar 53 is adjustable to vary the stroke of the cracking member 49. The spring 52 maintains a roller 54, journaled on the outer end of the cracking member 49, in position for engagement by a cam 55 provided on one side of the pulley 27.

The cracking member 48 has a collar or bracket 56 thereon, preferably adjustable, and it is engaged by an expansive coil spring 57 surrounding the cracking member 48 and one of the bearings 56.

The bracket 56 has an arm 58 slidable on a rod 59 fastened to an upright 60 on the base plate 46, and which upright also constitutes a bearing for the shaft 25. Said bracket 56 carries a roller 61 which is engaged with the operating face 62 of a cam 63 keyed to the shaft 25. The cam 63 longitudinally slides or displaces the cracking member 48, from the path of movement of the holder 20, at the time of discharge or ejection of a cracked nut. It must be realized of course that this extracting element 48 must be rigidly held in the position shown in Figure 3 when a nut is being cracked and to this end, a suitable locking means for the rod or cracking member 48, to hold it against longitudinal movement is provided.

This locking member is disclosed in the form of a lever 64 pivoted at 65 to the adjacent bearing 56. At one end of the lever 64 it is provided with an opening 66 through which the extracting member 48 passes and which opening is enlarged slightly relatively to the cracking member. Normally the locking member 64 is parallel to the adjacent bearing 56 and hence the cracking member 48 is free to slide. The locking member 64 is held in such position parallel to bearing 56 by means of a cam 67 rigid on the shaft 25. The cam 67 is so shaped however that slightly before the cracking operation, the cam permits swinging of the locking member 64, outwardly through the urgency of an expansive spring 68, causing the edges of the locking member as at 69, in the opening 66, to bite into the extracting member 48 and hold it against rectilinear movement.

As a result of the construction described, it will be realized that the nuts are fed or supplied from the hopper 10 by the prongs 13, one nut at a time, into the chute 18 from which they fall into the feeder 19 and from the latter they are ejected by the downward movement of the plunger 22, the latter forcing the nut through the lower end of the feeder, moving the wall or closure 23 outwardly and which nut falls into the holder or receptacle 20. The operation of the plunger 22 is controlled by the action of the cam 32 and spring 35 in combination with the lever 33. When a nut is received in the holder or receptacle 20, it must assume a longitudinal position due to the V-shape of the holder or receptacle. At this time, the extracting member 48 moves slightly to the right to engage the nut, following which the cam 67 permits the locking member 64 to move from the vertical position of Figure 4 to the locking position of Figure 8, biting the extracting member 48 and holding it rigid, after which, the cam 55 engages the roller 54 and moves the extracting member 49 to the left, thereby cracking the nut.

Thereupon, the spring 52 retracts the extracting member 49 and the cam 63 displaces the cracking member 48 to the left from across the path of movement of the receptacle 20. Thereupon, through the rotation of shaft 25, the arm 43 engages projection 44 and tilts the holder 20 so that it will discharge the cracked nut into a receptacle or otherwise.

It will be realized that the cracking members 43 and 49 are so timed as to be operated three times for each revolution of the wheel 12, so as to accommodate and crack all of the nuts supplied by wheel 12.

Furthermore, it will be understood that the capacity of the machine in relation to cam shaft 25 may be increased by placing another nut cracking unit on the opposite side of shaft 25 from that shown in Figure 3, and the extension of said shaft 25 other units placed on opposite sides of the shaft indefinitely, the units on opposite sides of the shaft being made right and left as will be clearly understood.

Various changes may be resorted to provided they fall within the spirit and scope of the invention.

We claim as our invention:—

1. A device of the class described having a rotatable shaft provided with a driving wheel thereon, a holder for a nut to be cracked, bearing means, aligned relatively slidable nut cracking rods mounted by said bearing means in parallelism to said shaft and co-acting with the holder, spring means urging one of the rods into cracking position disposed across the holder, a locking lever having an opening through which the last mentioned rod passes, a cam on said shaft operable to release the locking member, a cam on one side of said wheel operable to slide the other rod relatively to the companion rod to crack the nut, cam means on the shaft operable thereafter to retract the first mentioned rod from the path of the holder, means operable thereafter from the said shaft to move the holder to discharge the cracked nut.

2. A device of the class described having a support, a rotatable shaft journaled on the support having a driving wheel, bearing members on said support, a holder for a nut to be cracked located between two adjacent bearing members, aligned relatively slidable first and second nut cracking rods mounted by said bearings in parallelism to said shaft and co-acting with the holder, spring means urging the first mentioned rod into cracking position disposed across the holder, a locking lever pivoted to one of the bearings having an opening through which the first mentioned rod passes, a cam on said shaft operable to release the locking lever, a cam on one side of said wheel operable to slide the second mentioned rod relatively to the first mentioned rod to crack the nut, cam means on the shaft operable thereafter to retract the first mentioned rod from the path of the holder, means operable thereafter from the said shaft to move the holder to discharge the cracked nut, a bracket on the first mentioned rod, the said spring means engaging the bracket and one of the bearings, a bearing for the shaft having a guide rod rigid thereon in parallelism to the shaft, said bracket slidably engaging said guide rod, and said bracket having a part engageable by the adjacent cam.

FRED E. WHITEHEAD.
HOWARD T. BONAR.